United States Patent [19]

Brown, Jr.

[11] Patent Number: 5,331,888
[45] Date of Patent: Jul. 26, 1994

[54] OIL FILTER CRUSHER ASSEMBLY

[76] Inventor: David B. Brown, Jr., 204 Trinity Way, Greenville, S.C. 29608

[21] Appl. No.: 979,660

[22] Filed: Nov. 20, 1992

[51] Int. Cl.⁵ .......................... B30B 9/04; B30B 9/32
[52] U.S. Cl. ................................. 100/125; 100/214; 100/269 R; 100/902
[58] Field of Search ............ 100/48, 125, 214, 269 R, 100/299, 902; 92/153, 158, 159

[56] References Cited

U.S. PATENT DOCUMENTS

| | | | |
|---|---|---|---|
| 942,163 | 12/1909 | Berner | 100/269 R X |
| 948,882 | 2/1910 | Hubbard | 92/153 X |
| 999,087 | 7/1911 | Becker et al. | 100/214 X |
| 2,150,812 | 3/1939 | Aukerman | 100/902 X |
| 2,212,047 | 8/1940 | Ross | 100/214 X |
| 2,464,710 | 3/1949 | Patterson | 92/159 X |
| 2,616,477 | 11/1952 | Scheer et al. | 100/902 X |
| 2,982,200 | 5/1961 | Robertson et al. | 100/902 X |
| 3,190,214 | 6/1965 | Adams et al. | 100/214 |
| 4,203,353 | 5/1980 | Burnham et al. | 92/159 |
| 4,750,409 | 6/1988 | Hendry | 92/159 X |
| 5,109,763 | 5/1992 | Morris et al. | 100/48 |
| 5,136,934 | 8/1992 | Darby, Jr. | 100/299 X |
| 5,182,988 | 2/1993 | Styfhoorn | 100/902 X |

Primary Examiner—Stephen F. Gerrity
Attorney, Agent, or Firm—Ralph Bailey

[57] ABSTRACT

An upright oil filter crusher assembly has a horizontal head plate (A) and an air cylinder formed by a cylindrical wall (B) welded at an upper end to an underside of the head plate and freely suspended therefrom above a horizontal platen (G) with spaced tie rods (H) extend between and connecting the head plate and the platen, with an open well (I) for automatically dispensing lubricating oil in the air cylinder.

7 Claims, 3 Drawing Sheets

OIL FILTER CRUSHER ASSEMBLY

BACKGROUND OF THE INVENTION

This invention relates to an improved vertical oil filter crusher or compactor for aiding in satisfying environmental demands by providing inexpensive, easily operated means for removing used oil from oil filters.

There has long been a need for efficiently removing spent, dirty oil from used oil filters. Many efforts have been made to provide an efficient structure for this purpose. U.S. Pat. No. 2,150,812 illustrates an oil can crusher wherein an air cylinder has upper and lower end plates secured together by tie bolts. The air cylinder is carried by spaced uprights extending between an anvil for supporting an oil filter and a lower end plate of the air cylinder to act as guides for a plunger head for crushing the oil can. Thus, the air cylinder and crushing section are separate units which are joined together by the uprights as distinguished from an integral or unitary construction. Since the crusher is for an oil can rather than a filter, no provision is made for draining used oil. U.S. Pat. Nos. 2,150,812, 3,835,768, 4,126,160, 4,771,686, 4,927,085 and 5,060,564 illustrate more complex structures for crushing used oil filters representing the state of the art. Oil filter crushers have also been provided utilizing air cylinders to which upright structural members have been welded longitudinally warping the air cylinder wall.

SUMMARY OF THE INVENTION

Accordingly, it is an important object of this invention to provide an upright oil filter crusher wherein an air cylinder section and a lower crusher section are unitarily constructed.

Another object of the invention is to avoid welding structural members longitudinally of the air cylinder walls, with the attendant damage done during fabrication, through the use of the tie rods to join a head plate from which an air cylinder is freely suspended to a platen spaced therebeneath to provide an integral oil filter crushing section.

Another object of the invention is to provide an air cylinder having a piston acting as a ram for use as an oil filter crusher wherein a means for lubricating the piston includes an open wall in an upper surface thereof remote from an inlet for pressurized air for dispensing lubricant as a mist during crushing operations.

Still another object of the invention is to construct an air cylinder utilizing a circumferential weld sealingly and integrally joining a cylindrical wall to the head plate for freely suspending the air cylinder while providing a unitary structure having a crusher section therebeneath.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The drawings illustrate an upright oil filter crusher assembly including a substantially horizontal head plate A carried at an upper end of the oil filter crusher assembly. An air cylinder including a substantially vertical cylindrical wall B is secured at an open upper end in sealed relation to a lower surface of the head plate. A substantially horizontal air cylinder base C is carried in sealed relation at a lower end of the cylindrical wall. A piston D is carried in the cylindrical wall between the head plate and said cylinder base. A piston rod E is secured to the piston on one end and is slidably carried in the cylinder base and extends therebeneath on the other end. A ram head F is carried by the piston rod beneath the cylinder base. A substantially horizontal platen support G is provided for positioning oil filters beneath the ram head. A plurality of tie rods H are circumferentially spaced about the cylindrical wall extending between and connected on one end to the head plate and on the other end to the horizontal platen support. A first air inlet connection is provided for receiving pressurized air into said cylindrical wall above the piston. A second air inlet connection receives pressurized air into the cylindrical wall beneath the piston. A drain is provided for oil removed from the oil filters as a result of a crushing action of the ram head when it is lowered by the piston. Thus, the cylindrical wall need only be fixed at an upper end to the head plate, and the horizontal support and head plate are joined by tension members thus minimizing the need for structural connectors while providing strength to the assembly.

Means to lubricate the piston D as it moves in the cylinder during crushing operation includes a well I for receiving lubricating oil. The well I opens in an upper surface of the piston D remote from the first air inlet connection. A refill oil plug is carried above the piston for adding lubricating oil as needed. The well I surrounds a bolt countersunk in a central portion of an upper surface of the piston D. The refill oil plug is positioned above the well in the head plate.

Figure 2:
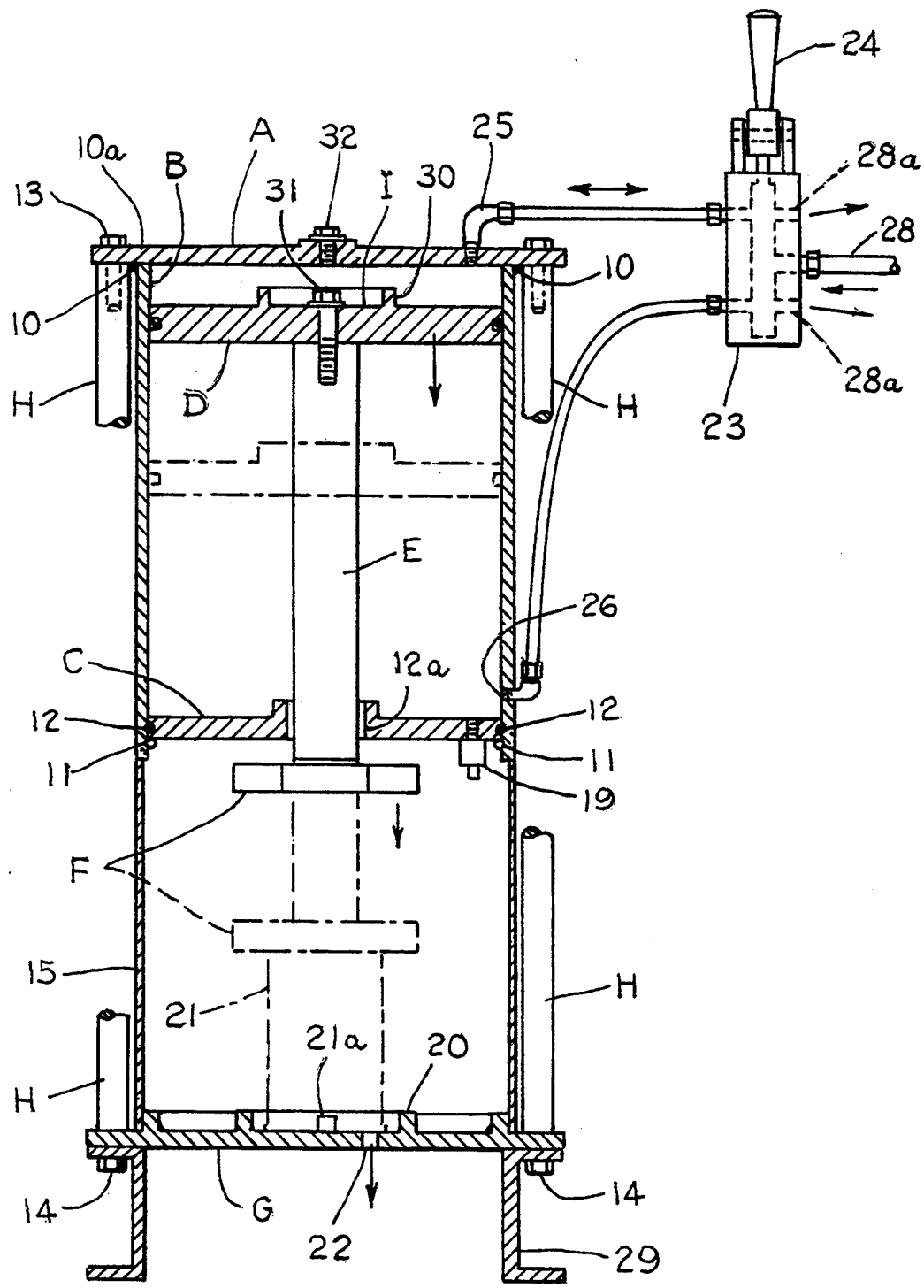
FIG. 2 is a transverse sectional elevation taken on the line 2—2 in FIG. 1 illustrating suspension of an air cylinder from a head plate which is joined by tie rods to a horizontal platen support and schematically illustrating an air control valve.
Figure 3:
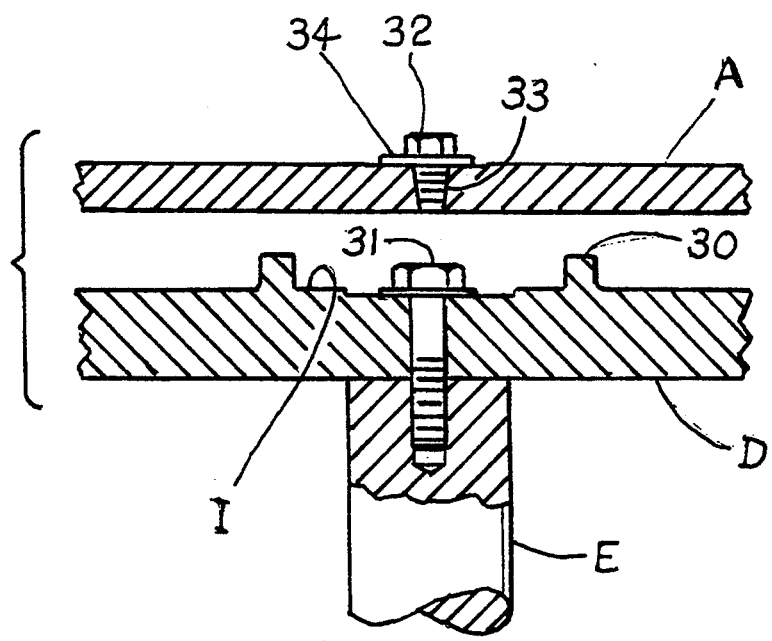
FIG. 3 is an enlarged sectional elevation further illustrating a means for lubricating a piston carried in the air cylinder of FIG. 1.
Figure 4:
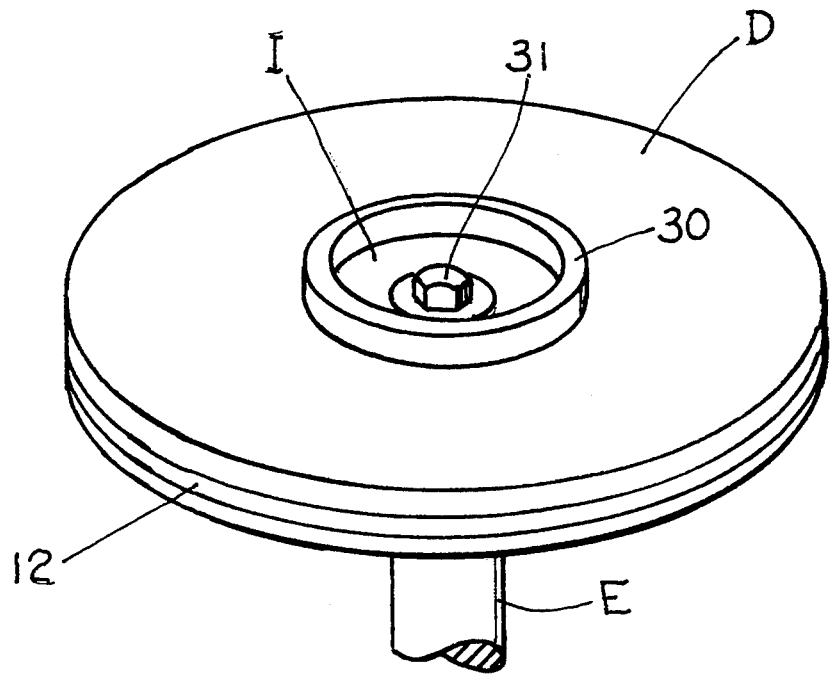
FIG. 4 is an enlarged perspective view looking from above further illustrating the piston and the means for lubricating the piston.

The cylindrical walls B forming the air cylinder are suspended from the head plate A. In this connection it is important to note that the cylindrical wall B is secured to the underside or lower surface of the head plate A in sealing or air tight relation s by welding as at 10. As shown, in FIG. 2, the horizontal air cylinder base C is secured within a lower end of the cylindrical wall by a retaining ring 11 and is sealed as by an O-ring 12. Thus, an air cylinder is formed by the cylindrical wall B and suspended from a head plate A of the assembly. The air cylinder contains a piston D within the cylindrical wall B.

A vertical piston rod E is connected on one end to the piston and is slidably supported on the other end by the horizontal air cylinder base C in the bronze bushing 12a. The piston rod E extends through and below the air cylinder base C and carries at its free end a ram head F.

The head plate A and the cylindrical wall B suspended therefrom with associated parts are connected to the platen G by a plurality of tie road H. A tie rod H is illustrated as being bolted as at 13 directly to an overhanging marginal portion 10a extending outwardly of the weld 10 in each corner of the head plate A. The other ends of the respective tie rods are bolted as at 14 in each corner of the platen G. By thus utilizing the tie rod tension members, the structural requirements for exerting the crushing force by the ram head F are met while the air cylinder is suspended from the head plate. Thus, it is unnecessary as in the prior art to weld axially of the air cylinder, with the attendant possibility of warping the cylindrical walls, in order to secure a structural member to join an air cylinder to a platen.

An enclosure 15 contains used oil removed by crushing from the oil filters below the cylinder base C within the tie rods. An access door 16 is hinged as at 17 in the enclosure opening for inserting and removing oil filters before and after crushing respectively. The enclosure 15 with the door 16 closed and latched by turning the handle 18 keeps oil from spraying out of the enclosure during crushing. A pressure relief valve 19 is positioned beneath the piston in the air cylinder base C for removing air from within the cylindrical wall in case excessive pressure develops during crushing or for any other reason.

A central upright receiving and collecting wall 20 is provided for positioning the oil filters 21 and extends above the horizontal platen support G. A vertical positioning member 21a is carried centrally of the platen G. The drain 22 is positioned within the collecting wall 20.

Figure 1:
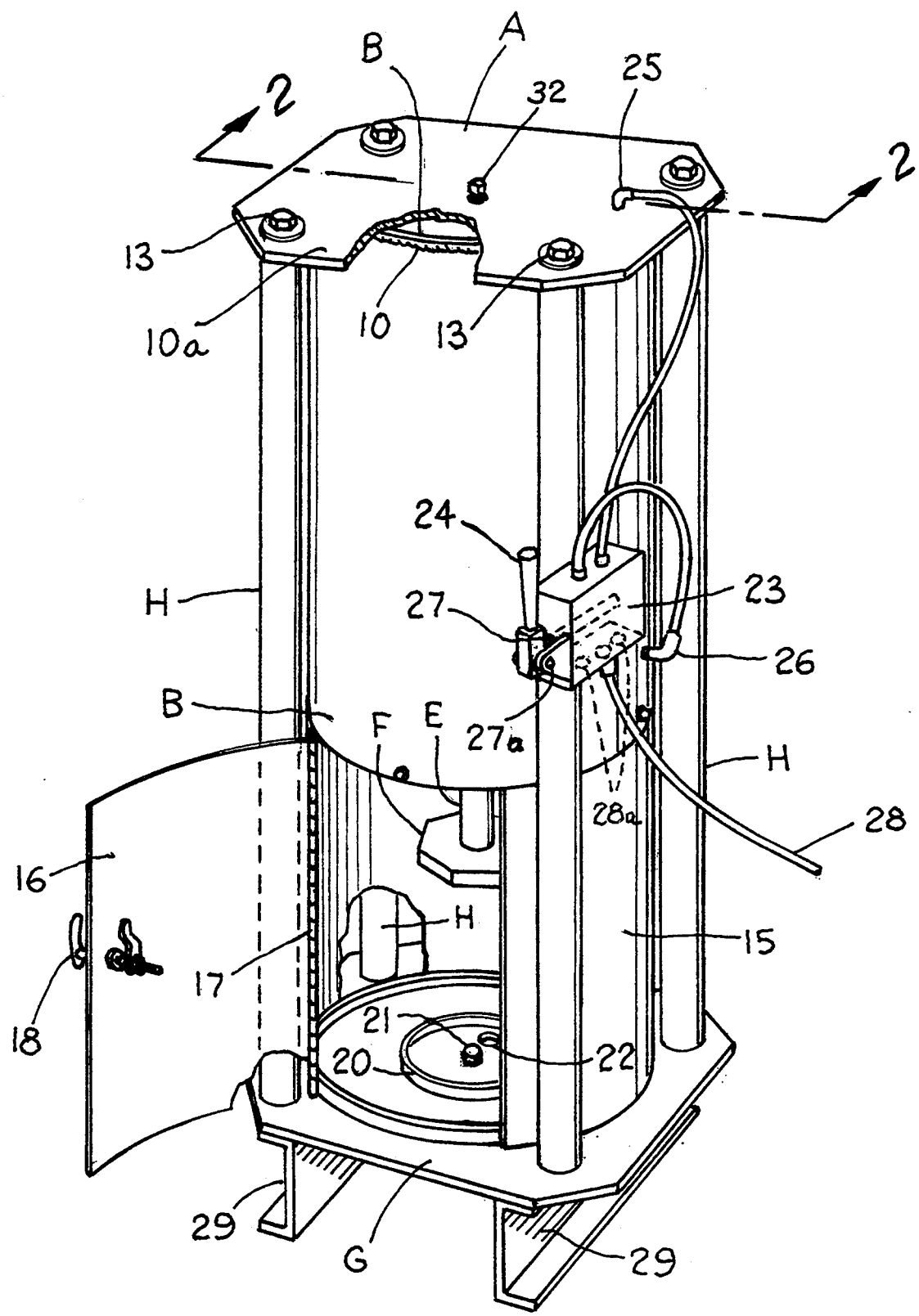
FIG. 1 is a front perspective view looking from above with parts broken away, illustrating an upright oil filter crusher assembly constructed in accordance with the invention.

A valve having a housing 23 and an actuating lever 24 is carried by the assembly as by fastening to an adjacent tie rod H as illustrated in FIG. 1. An upper air connection 25 opens into the housing 23 above the piston D. A lower connection 26 opens below the piston. The actuating lever 24, when lowered to actuate a valve operation member 27, connects the upper air connection 25 to a source of pressurized air provided by the line 28 for forcefully lowering the piston on a crushing stroke. The lever 24 is pivoted as at 27a. By raising the lever 27 the piston is raised preparatory to crushing another oil filter. Exhaust ports 28a are provided for removing air from above or below the piston D as needed in carrying out the crushing cycle. It has been found that a suitable valve is 1S1 Fluid Power Valve PT. #375-02T-E01-13T of 34575 Commerce Rd., Fraser, Mich. 48026.

The platen G is suitably supported by the spaced channel members 29 to facilitate drainage of used oil compressed from the oil filters.

Referring again to the means for lubricating the piston D within the cylindrical walls C, the open well I is formed within the wall 30. The wall 30 provides a countersunk locating means for the bolt 31 which extends in the upper end of the piston rod E for securing the piston to the upper end of the rod. Since the well I is somewhat remote from the inlet connection 25 only limited amounts of lubricating oil are material thereby to the inner surface of the cylindrical wall B.

The refill oil plug 32 is carried above and in alignment with the wall I. A threaded oil plug 32 is preferably centrally located in the head plate A and extends through a threaded opening 33. The washer 34 closes the threaded opening 33 by tightening the threaded plug 32.

It is thus seen that a vertical oil can crusher having a simple, inexpensive structure is easily and conveniently operated in response to pressurized air to provide effective crushing action with low maintenance. Lubrication of the air operated piston is automatically accomplished and a source of lubricant readily provided.

While a preferred embodiment of the invention has been described using specific terms, such description is for illustrative purposes only, and it is to be understood that changes and variations may be made without departing from the spirit or scope of the following claims.

What is claimed is:

1. An upright oil filter crusher assembly comprising:
   a substantially horizontal head plate;
   a substantially vertical cylindrical wall;
   means securing an upper end of said cylindrical wall in sealed relation to said head plate so that said cylindrical wall is suspended therefrom;
   a substantially horizontal air cylinder base carried in sealed relation with said cylindrical wall at an end thereof opposite said head plate;
   a piston carried in said cylindrical wall between said head plate and said cylinder base;
   a piston rod secured on one end thereof to said piston and extending slidably through said cylinder base;
   a ram head carried by said piston rod beneath said cylinder base on a free end of said piston rod opposite said one end thereof;
   a substantially horizontal platen support carried beneath said ram head for positioning an oil filter for engagement by said ram head;
   a plurality of tie rods circumferentially spaced about said cylindrical wall extending between the head plate and said horizontal platen support;
   respective first means for connecting each said tie rod on an upper end thereof to said head plate for supporting said head plate and the cylindrical wall suspended therefrom, each said first connecting means supporting said head plate against downward movement on said tie rods;
   means connecting said tie rods on a lower end thereof to said horizontal platen support for supporting said tie rods, head plate and the cylindrical wall suspended therefrom;
   a first air inlet connection for receiving pressurized air into said cylindrical wall above said piston for forcefully lowering said ram head exerting a crushing action on an oil filter; and
   a second air inlet connection for receiving pressurized air into said cylindrical wall beneath said piston for raising said ram head;
   whereby said cylindrical wall is fixed at an upper end of said head plate suspending said therefrom, and said horizontal platen support and said head plate are joined by said tie rods supporting said head plate and the cylindrical wall suspended therefrom in compression and acting as tension members during a crushing action of the ram head thus providing strength to the assembly.

2. The structure set forth in claim 1 including:
   an upper surface on said piston;
   a well for receiving lubricating oil opening in said upper surface of said piston remote from said first air inlet connection; and a refill oil plug in said horizontal head plate carried above said piston for adding lubricating oil to said well as needed.

3. The structure set forth in claim 2 including a bolt countersunk in a central portion of an upper surface of said piston securing said piston to said piston rod;

whereby said well surrounds said bolt and said refill oil plug is positioned thereabove in said head plate.

4. The structure set forth in claim 1 including:

an enclosure acting as a shield retaining oil sprayed when removed by crushing from said oil filters carried below said cylinder wall within said tie rods; and an access door in said enclosure for inserting and removing oil filters before and after crushing respectively.

5. The structure set forth in claim 1 including an air valve carried by said assembly connected to said inlet and outlet connections; and an actuating lever alternately connecting said air inlet connections to a source of pressurized air for forcefully lowering said piston on a crushing stroke and then raising said piston preparatory to crushing another oil filter.

6. The structure set forth in claim 1 wherein said one end of said tie rods are connected directly to a marginal, overhanging portion of said head plate by bolts and wherein the other end of said tie rods are connected directly to a marginal portion of said platen support by bolts.

7. The structure set forth in claim 6 wherein said cylindrical wall is secured to said head plate by welding for freely suspending the air cylinder therefrom.

* * * * *